(12) United States Patent
Varcus

(10) Patent No.: US 8,646,845 B2
(45) Date of Patent: Feb. 11, 2014

(54) SEAT BELT ARRANGEMENT FOR A SEAT OF A VEHICLE

(75) Inventor: Johannes A Varcus, Sprockhovel (DE)

(73) Assignee: Ford Global Technologies, LLC, Dearborn, MI (US)

(*) Notice: Subject to any disclaimer, the term of this patent is extended or adjusted under 35 U.S.C. 154(b) by 342 days.

(21) Appl. No.: 13/102,344

(22) Filed: May 6, 2011

(65) Prior Publication Data

US 2012/0001466 A1 Jan. 5, 2012

(30) Foreign Application Priority Data

Jun. 30, 2010 (DE) .......................... 10 2010 030 712

(51) Int. Cl.
*B60R 22/26* (2006.01)
*B60R 22/30* (2006.01)

(52) U.S. Cl.
USPC ........................................... 297/483; 280/808

(58) Field of Classification Search
USPC ................................ 297/483; 280/808, 801.1
See application file for complete search history.

(56) References Cited

U.S. PATENT DOCUMENTS

| 4,730,875 A | 3/1988 | Yoshitsugu |
| 5,350,196 A | 9/1994 | Atkins |
| 5,897,169 A * | 4/1999 | Larsen et al. ................ 297/483 |
| 7,273,232 B2 * | 9/2007 | Fontecchio et al. .......... 280/808 |
| 7,387,315 B2 * | 6/2008 | Nett et al. ............... 280/801.1 X |
| 7,520,532 B2 * | 4/2009 | Bell et al. ...................... 280/808 |
| 7,823,974 B2 * | 11/2010 | Mendenhall ............. 297/255 X |

FOREIGN PATENT DOCUMENTS

| DE | 19838930 C1 | 12/1999 |
| EP | 0215220 A1 | 3/1987 |
| EP | 0254260 A1 | 1/1988 |

* cited by examiner

*Primary Examiner* — Anthony D Barfield
(74) *Attorney, Agent, or Firm* — Vichit Chea; Brooks Kushman P.C.

(57) ABSTRACT

A seatbelt guide is attached to a seat of a motor vehicle in the shoulder area of the seat to guide a shoulder belt. The guide includes an inner element fixed relative to the seat, and an outer element spaced from the inner element by a distance to receive and guide the seatbelt. The outer element is movable relative to the inner element in a longitudinal direction to allow the seatbelt to be removed from the guide. This may be desirable if, for example, the seat has a fold-down back rest. The outer element pivots about a pivot axis extending approximately in a transverse direction of the vehicle.

13 Claims, 2 Drawing Sheets

SEAT BELT ARRANGEMENT FOR A SEAT OF A VEHICLE

CROSS-REFERENCE TO RELATED APPLICATIONS

This application claims foreign priority benefits under 35 U.S.C. §119(a)-(d) to DE 10 2010 030 712.2, filed Jun. 30, 2010, which is hereby incorporated by reference in its entirety.

TECHNICAL FIELD

The invention relates to a seat belt arrangement for a seat of a vehicle, in particular a motor vehicle, comprising a shoulder belt part, which is passed through a slotted guide of a guide clip in the region of a backrest of the seat.

BACKGROUND

EP 0 215 220 teaches a three-point seat belt configuration in which a shoulder belt part is placed through a guide slot having an approximately S-shaped curve.

EP 0 254 260 A1 teaches a webbing guide for use with a seat belt apparatus, the webbing guide having a guide hole for the shoulder webbing portion. The webbing guide has crank-shaped outline to keep the shoulder webbing from becoming twisted or reversed in the guide hole. The webbing guide additionally has an upwardly open slot, through which the shoulder belt part may be removed from the guide.

U.S. Pat. No. 5,350,196 teaches a clamping device for use with a restraining belt. The clamping device has a lever actuated cam, and in the clamped position the lever closes off an opening in the slot.

DE 198 38 930 C1 teaches a seat belt arrangement comprising a shoulder belt part which is placed through a slotted guide of a guide clip in the region of a backrest of the seat provided with a folding mechanism. The slotted guide is formed at least partially by an unlocking lever for unlocking the folding mechanism of the backrest and which, for unlocking, may be moved from the position closing the slot laterally in the transverse direction of the vehicle, the slot being opened up.

SUMMARY

In a disclosed embodiment, a seatbelt guide attached to a seat of a motor vehicle comprises an inner element fixed relative to the seat, and an outer element spaced from the inner element by a distance to receive the seatbelt. The outer element is movable relative to the inner element in a longitudinal direction to allow the seatbelt to be removed from the guide. This may be desirable if, for example, the seat has a fold-down back rest.

In another disclosed embodiment, a seatbelt guide for attachment to a seat of a motor vehicle comprises an inner element adapted to be rigidly attached to the seat adjacent a shoulder area of the seat, and an outer element movably attached to the inner element and movable relative thereto in a fore-and-aft direction. The outer element is movable between a guide position wherein the elements form a through-opening to retain a seatbelt and a folded position wherein the seatbelt is easily removed from engagement with the guide.

In another disclosed embodiment, a seat and occupant restraint assembly for a motor vehicle comprises a backrest foldable between an upright position and a folded forward position; a seatbelt; an inner guide element fixed relative to the backrest; and an outer element movably attached to the backrest and movable relative thereto in a fore-and-aft direction between a guide position wherein the inner and outer elements form a through-opening to retain the seatbelt, and a folded position wherein the seatbelt is easily removed from engagement with the guide.

BRIEF DESCRIPTION OF THE DRAWINGS

Further details, features and advantages of the invention are revealed from the following description of an exemplary embodiment with reference to the drawing, in which.

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
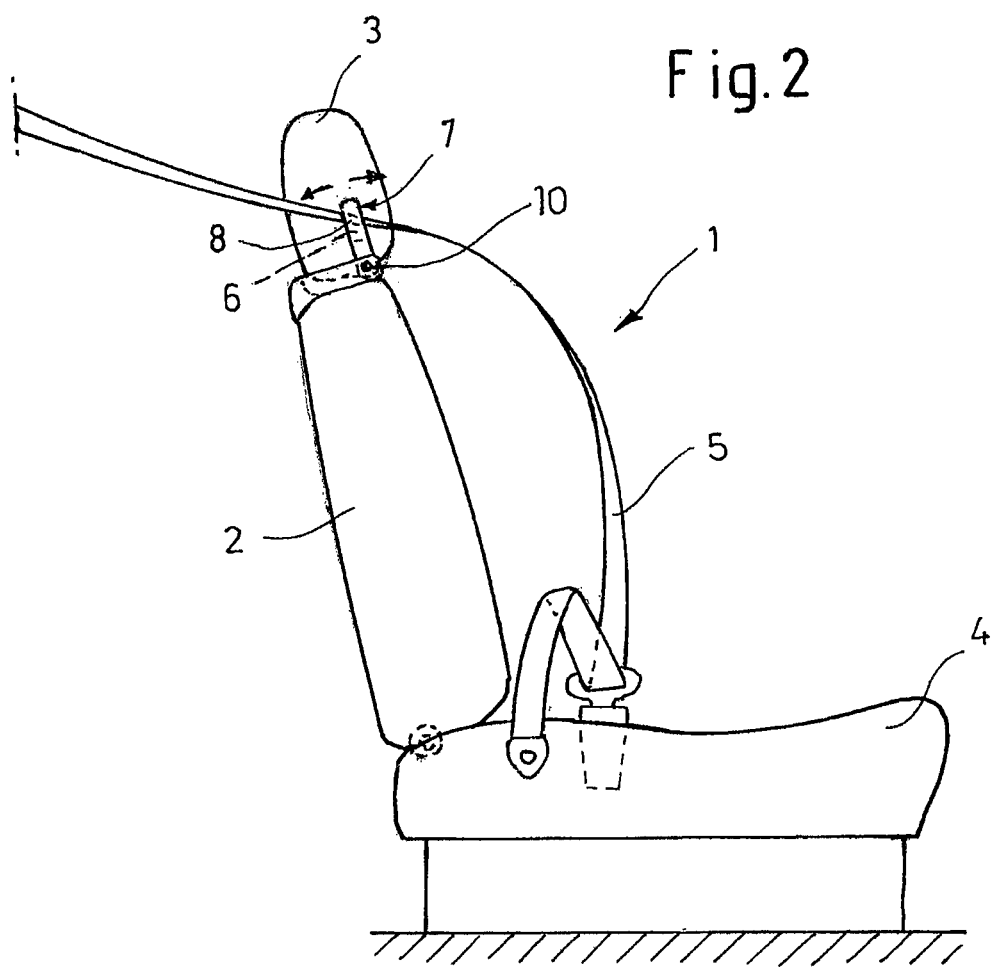
FIG. 2 shows a schematic side view of the vehicle seat of FIG. 1.

A driver's seat of a passenger vehicle denoted as a whole by 1 is shown in the figures. The driver's seat 1 comprises a backrest 2 having a headrest 3 and which may be folded to the front in the longitudinal direction of the vehicle, and a seat surface 4 and a safety belt 5 (see FIG. 2).

The driver's seat 1 further comprises a slotted guide 6 of a guide clip 7 in the region of the upper backrest 2 of the seat, on the outside adjacent to the headrest 3, through which the shoulder part of the safety belt 5 is placed.

The guide clip 7 comprises two lateral guide elements 8A, B which together form a through-opening 9 of the slotted guide. The outer guide element 8A is movable in the longitudinal direction of the vehicle in the direction of the arrows.

To this end, the guide clip 6 comprises a pivot axis 10 extending approximately in the transverse direction of the vehicle, about which the outer guide element 8A may be pivoted against a restoring spring force. A simple design results when the guide clip has a pivot axis extending approximately in the transverse direction of the vehicle, about which the outer guide element may be pivoted.

The term "approximately in the transverse direction of the vehicle" is meant to describe a direction or axis that is within plus-or-minus 30° of the transverse vehicle axis.

Figure 1A:
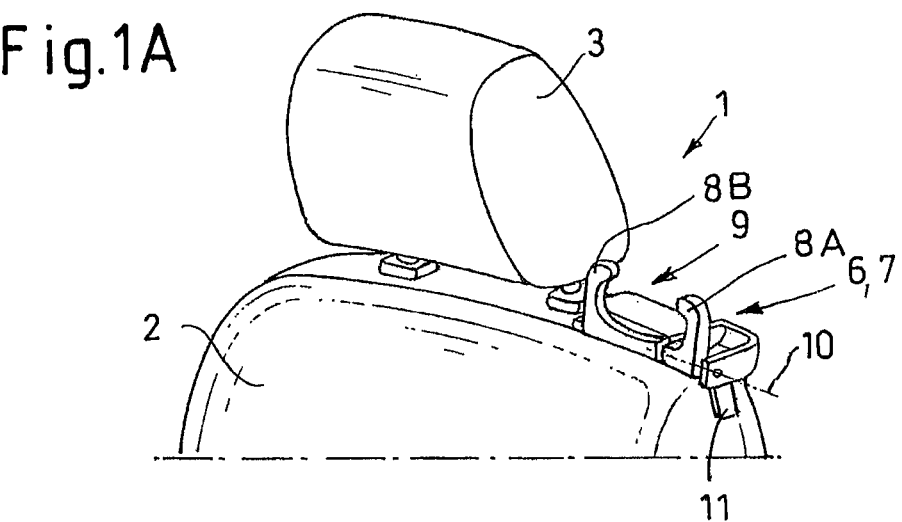
FIG. 1A shows a schematic, perspective view of a vehicle seat in the region of the headrest with a guide in a belt retaining position.

Preferably, to this end the guide clip of the slotted guide has two lateral guide elements which together form a through-opening of the slotted guide, the outer guide element being movable in the longitudinal direction of the vehicle. Thus, said element may "fold away" in a movable manner "to the front", "to the rear" or in both directions relative to the seat and to the overall vehicle. When the outer guide element is in the upright position shown in FIG. 1A, it may be said to be in a guide position, while when it is in either of the lowered positions shown in FIGS. 1B and 1C, it may be said to be in a folded position.

Injuries may be avoided more easily if the outer guide element is received in a recess in the pivoted state. Thus said outer guide element no longer protrudes, even in the "folded up" state.

Figure 1B:
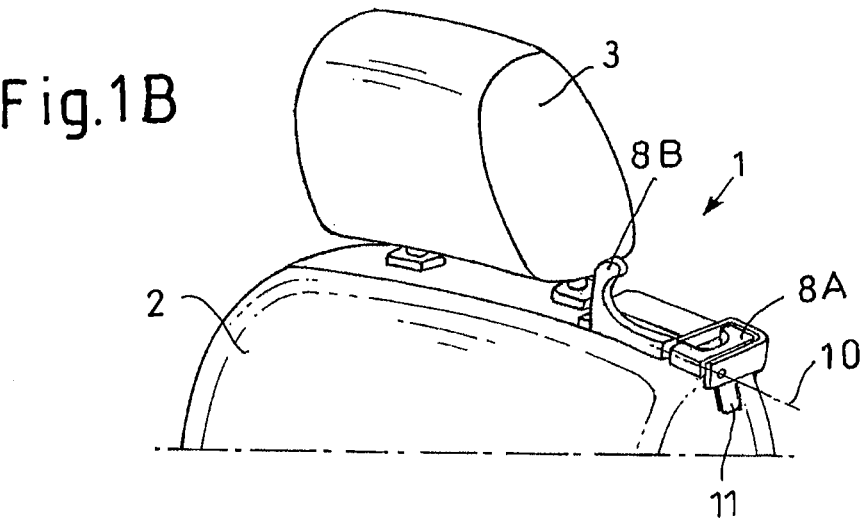
FIG. 1B shows a schematic, perspective view of a vehicle seat in the region of the headrest with the guide folded to the rear in a belt releasing position.
Figure 1C:
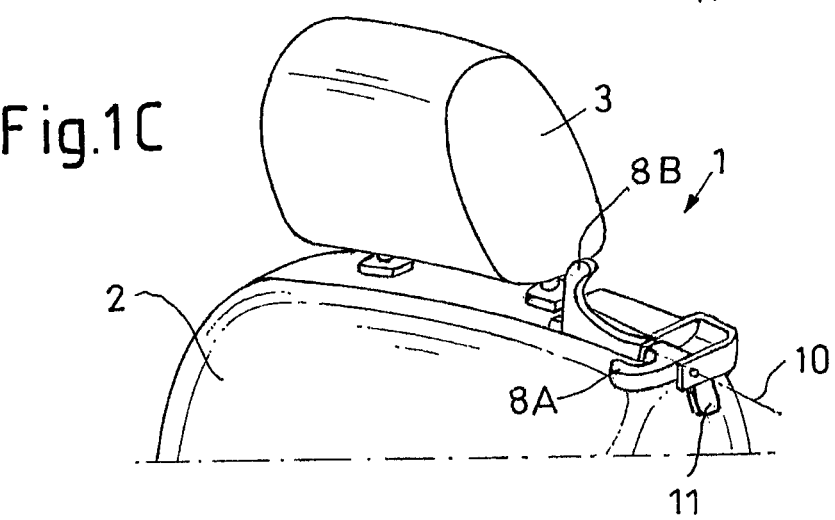
FIG. 1C shows a schematic, perspective view of a vehicle seat in the region of the headrest with the guide folded forward in a second belt releasing position.

As is revealed from the three different positions A, B and C in FIG. 1, in the present example the outer guide element 8A may be pivoted to both the front (FIG. 1C) and to the rear (FIG. 1B).

The guide clip 7 may be formed by plastics parts incorporated in the backrest 2, and in which additionally an unlocking lever 11 is provided for actuating a folding mechanism of the seat backrest 2. Naturally, the slotted guide may have an unlocking lever for actuating a folding mechanism of the seat backrest.

The described embodiments provide a seat belt guide arrangement which improves the seat belt guidance on the seat and, at the same time, is of narrow construction and has a certain flexibility, so that for example injuries are avoided.

As the guide clip of the slotted guide is rigid in the transverse direction of the vehicle and movable in the longitudinal direction of the vehicle, it is possible to provide very narrow and yet flexible belt guidance. Said belt guidance is able to "fold away" due to the flexibility, to avoid injuries and faulty operation and when folding up the backrest.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seatbelt guide attached to a seat of a motor vehicle, comprising:
    an inner element fixed relative to and extending upward from an outboard shoulder area of the seat; and
    an outer element extending upward from the outboard shoulder area and spaced laterally outboard from the inner element to form a through-opening for receiving the seatbelt, the outer element movable relative to the inner element in a longitudinal direction to release the seatbelt.

2. The apparatus according to claim 1, wherein the outer element pivots about a pivot axis extending approximately in a transverse direction of the vehicle.

3. The apparatus according to claim 1, further comprising a recess receiving the outer element when the outer element is moved to release the seatbelt.

4. The apparatus according to claim 1, further comprising an unlocking lever for unlocking a folding mechanism of the seat.

5. A seatbelt guide for attachment to a seat of a motor vehicle, comprising:
    an inner element adapted to be rigidly attached to the seat adjacent a shoulder area of the seat; and
    an outer element spaced laterally outboard of and movably attached to the inner element and movable relative thereto in a fore-and-aft direction between a guide position wherein the elements form a through-opening to retain a seatbelt and a folded position wherein the seatbelt is easily removed from engagement with the guide.

6. The apparatus according to claim 5, wherein the outer element pivots about a pivot axis extending approximately in a transverse direction of the vehicle.

7. The apparatus according to claim 5, further comprising a recess receiving the outer element when the outer element is in the folded position.

8. The apparatus according to claim 5, further comprising an unlocking lever for unlocking a folding mechanism of the seat.

9. The apparatus according to claim 5, wherein the outer element is biased toward the guide position by a restoring spring force.

10. A seat and occupant restraint assembly for a motor vehicle, comprising:
    a backrest foldable between an upright position and a folded forward position;
    a seatbelt;
    an inner guide element fixed relative to a shoulder area of the backrest; and
    an outer element spaced laterally outboard of the inner guide element and movably attached to the backrest and movable relative thereto in a fore-and-aft direction between a guide position wherein the inner and outer elements form a through-opening to retain the seatbelt and a folded position wherein the seatbelt is easily removed from engagement with the guide.

11. The apparatus according to claim 10, wherein the outer element pivots about a pivot axis extending approximately in a transverse direction of the vehicle.

12. The apparatus according to claim 10, further comprising a recess receiving the outer element when the outer element is in the folded position.

13. The apparatus according to claim 10, further comprising an unlocking lever for unlocking a folding mechanism to allow folding of the backrest away from the upright position.

* * * * *